United States Patent [19]

Girguis

[11] 3,928,985

[45] Dec. 30, 1975

[54] CONSTANT VELOCITY TORQUE TRANSMITTING UNIVERSAL JOINT

[75] Inventor: Sobhy Labib Girguis, Troisdorf, Germany

[73] Assignee: Uni-Cardan AG, Lohmar, Germany

[22] Filed: May 13, 1974

[21] Appl. No.: 469,601

[30] Foreign Application Priority Data

May 11, 1973 Germany............................ 2323822

[52] U.S. Cl........................................... 64/21; 64/8
[51] Int. Cl.²............................................ F16D 3/30
[58] Field of Search ............................ 64/21, 8, 6, 7

[56] References Cited
UNITED STATES PATENTS

| | | | |
|---|---|---|---|
| 3,176,477 | 4/1965 | Mazziotti................................ | 64/21 |
| 3,553,979 | 1/1971 | Noguchi et al. ......................... | 64/21 |
| 3,592,023 | 3/1971 | Okoshi.....................:................ | 64/21 |
| 3,789,626 | 2/1974 | Girguis..................................... | 64/21 |

*Primary Examiner*—Samuel Scott
*Assistant Examiner*—Randall Heald
*Attorney, Agent, or Firm*—Edmund M. Jaskiewicz

[57] ABSTRACT

A universal joint comprises a tubular outer joint member having a plurality of grooves therein and a concave spherical surface within which is moveably mounted a cage having a plurality of openings in which balls are positioned. The inner surface of the cage is provided with a concave spherical opening within which is moveably mounted an inner joint member having circumferentially spaced grooves there around. Each ball is located in opposed grooves of the inner and outer joint members and the balls are disposed in a plane passing through the axes of the outer and inner joint members. Because of play in the joint brought about by manufacturing tolerances the balls are subjected to a force which displaces the balls from the homokinetic plane. Means are therefore provided on a member of the joint which either coacts with the balls or another member of the joint to increase the angle between the plane passing through the balls and the axis of the inner joint member to control the alignment direction of the balls.

6 Claims, 15 Drawing Figures

CONSTANT VELOCITY TORQUE TRANSMITTING UNIVERSAL JOINT

The present invention relates to a constant velocity torque transmitting universal joint, more particularly, to structure for controlling the direction alignment of the balls which transmit the torque between the inner and outer joint members.

It has been known to construct constant velocity homokinetic torque transmitting universal joints to comprise an outer joint member having a bore therethrough with ball grooves formed in the inner wall surface of the bore. An inner joint member is positioned within the bore and has its outer surface provided with a plurality of ball grooves corresponding in number to the ball grooves in the outer joint member. A ball is jointly positioned in each pair of opposed grooves in the inner and outer joint members and the balls are disposed in a plane passing through the axes of the inner and outer joint members. The balls are subjected to forces arising from play in the joint resulting from manufacturing tolerances. These forces tend to displace the ball members out of the homokinetic plane and have the overall effect of reducing the angle between the ball plane and the axis of the inner joint members. It is further known to provide a cage between the inner and outer joint members to retain the balls in position.

In known constant velocity torque transmission joints of the double offset type wherein the cage is supported on its outer surface from the outer joint member and on its inner surface from the inner joint member, manufacturing tolerances or clearances in the components generally cause a slight displacement or shift of the balls out of the true homokinetic plane. Upon bending of the joint, this displacement occurs in the direction of opening of the ball grooves which are thereby spaced radially apart. The forces acting upon the balls tend to tilt the cage and thus cause the cage to tilt from its intended or designed position. Further, the cage is elastically deformed which eventually results in a change and deviation from the designed position of the cage. Actually, starting from the extended or straight position of the joint into a bent or angle position, the cage will be moved away from the axis of the outer joint member through an angle which is greater than one half the bending angle of the joint.

Such a shifting of the cage and displacing of the balls from the homokinetic plane will adversely affect the homokinetic operating characteristics of the universal joint. Further, the balls passing approximately through the region of the plane containing the axis of the inner and outer joint members do not transmit torque while the remaining balls are subjected to a correspondingly higher torque load. As a result, the static load capacity of the joint is correspondingly reduced. This brings about a reduction in the operating life of the joint since the operating life represents a function of the ball load to approximately the third or fourth power.

With respect to the decrease of the operating life of the joint because only a few of the balls carry the torque load, the partial load peaks have more significant effects than the loads in the relief phase. This is because the absolute values of the load peaks are substantially higher than those in relief phase.

It is therefore the principal object of the present invention to provide a novel and improved constant velocity torque transmitting universal joint.

It is another object of the present invention to provide such a universal joint which has a higher static loadbearing capacity and which has significantly improved homokinetic operating characteristics particularly in the main operating range.

It is a further object of the present invention to provide such a universal joint having a more uniform load distribution on the balls and at the same time to increase significantly the operating life of the universal joint as a whole.

According to one aspect of the present invention a constant velocity torque transmitting universal joint may comprise an outer joint member having a bore therethrough and a plurality of grooves in the inner surface of the bore. An inner joint member is positioned within the bore and is similarly provided with a corresponding plurality of grooves in the outer surface thereof opposing the outer joint grooves. A ball is jointly received in each pair of opposed inner and outer joint member grooves with the balls being disposed in a plane passing through the axes of the outer and inner joint members. Means which may comprise a cage is disposed between the outer and inner joint members for retaining the balls. The balls are subjected to a force brought about by play in the joint and this force displaces the balls from the homokinetic plane. Means are provided for increasing the angle between the plane passing through the balls and the axis of the inner joint member so as to control the alignment direction of the balls. The means may be on an element of the joint and acting upon the balls or upon other elements of the joint to bias the ball plane in such a direction to increase the angle between the ball plane and the axis of the inner joint member.

In a universal joint comprising a cage having an outer spherical surface moveably positioned on a corresponding surface of the outer joint member and an inner spherical surface positioned on a correspondingly shaped surface of the inner joint member, according to the present invention the means for increasing the angle may reside in the relationship wherein the distance between the center of the inner spherical surface of the cage and the ball plane is less than the distance between the center of the cage outer spherical surface and the ball plane.

In addition, the ball grooves in the inner and outer joint members may be positioned at an angle to their respective longitudinal axes and the ball grooves of the outer joint member may be inclined at a greater angle to the longitudinal axis of the outer joint member than the ball grooves of the inner joint member are inclined to the longitudinal axis of the inner joint member.

Also in accordance with the present invention the ball apertures or openings in the cage may be shaped so that the aperture wall nearest to the cage concave inner spherical surface is inclined toward the ball plane in a direction outwardly of the cage and the opposite aperture wall is parallel to the inclined wall.

Other objects and advantages of the present invention will be apparent upon reference to the accompanying description when taken in conjunction with the following drawings, which are exemplary, wherein.

Proceding next to the drawings wherein like reference symbols indicate the same parts throughout the various views a specific embodiment and modifications of the present invention will be described in detail.

Figure 1:
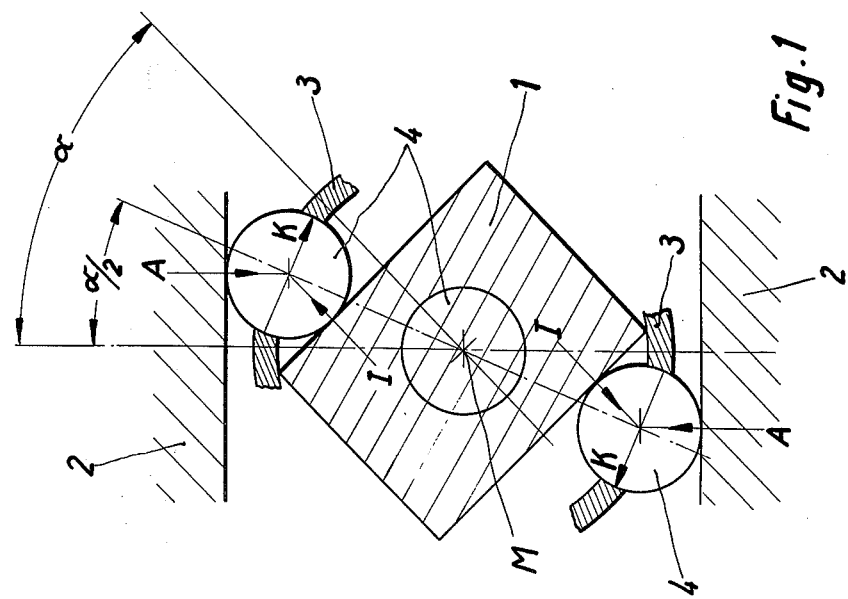
FIG. 1 is a diagrammatic presentation viewing the joint in a longitudinal direction and illustrating the forces acting on a cage and on the balls when the joint is provided with a retaining cage.

In FIG. 1 there is shown an inner joint member 1, an outer joint member 2, a cage 3 and the balls retained in the cage are indicated at 4. Only the base of a ball groove has been shown. When the joint is being bent and is transmitting a torque load or an angle, the balls 4 are exposed to a force A imparted by the outer joint member 2 and a force I imparted by the inner joint member 1 which produces a resultant force K. The force K acting upon the balls 4 as shown in FIG. 1 create a torque about the center M of the universal joint. Because of the contact between the balls 4 and the cage 3 a tilting force acts upon the cage 3.

Figure 2:
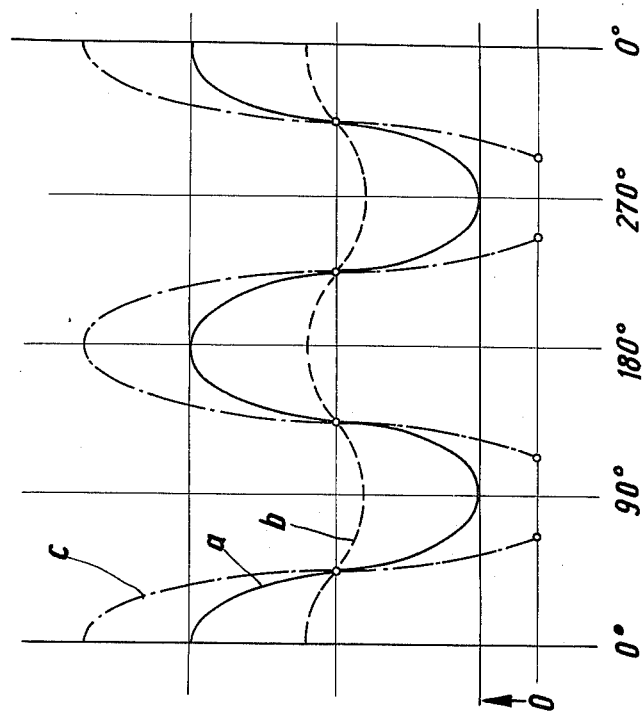
FIG. 2 is a graph illustrating the torque load on the balls over a single revolution of the joint.

The load conditions to which the balls are subjected during one revolution of the universal joint are diagrammatically shown in FIG. 2 wherein the $x$-axis represents the angle of rotation and the load is represented by $y$-axis. The curve $a$ represents loads upon the balls in the usual situation wherein the components of the universal joint have clearances or tolerances resulting from the manufacturing operation. Curve $b$ shows the load on the balls for a joint provided with the alignment control according to the present invention. Curve $c$ illustrates that for larger bending angles of the universal joint the amplitudes become so large that the zero line is intersected which means that beyond a certain bending angle the ball will not be subjected to any load and, accordingly will not transmit any torque.

Figure 3:
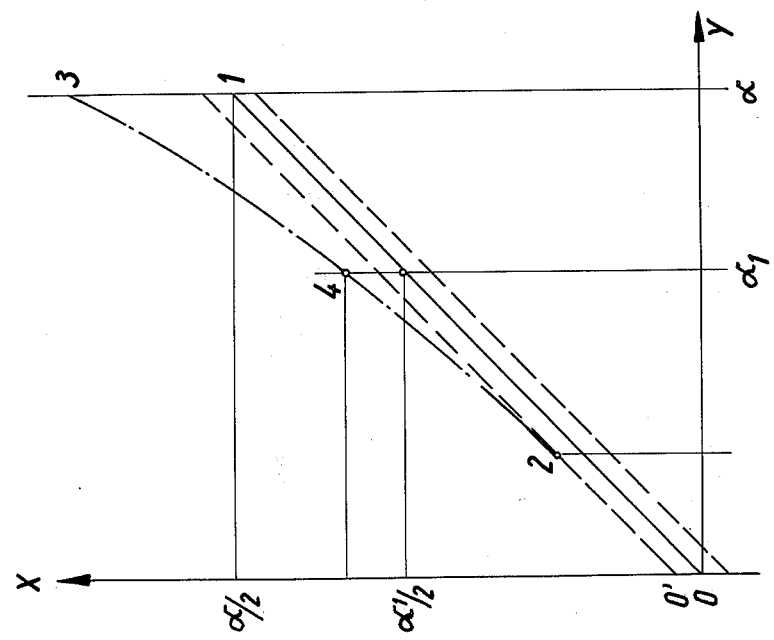
FIG. 3 is a graph showing the angle relations in a universal joint caused by manufacturing tolerances.

In FIG. 3, the $y$-axis represents the bending angle of the joint while the $x$-axis shows the angle of the cage, begining with the extended or straight position of the joint. The line 0-1 represents the ideal or theoretical condition wherein the cage moves through precisely one-half of the bending angle of the joint. This line makes no allowance for any manufacturing tolerances and resulting clearances. Parallel to the ideal situation as represented by the line 0-1 there are shown the various shifts or deviations from the ideal which may arise from possible manufacturing tolerances. However, it is pointed out that no allowance has been made for any elastic deformation of the cage under a torque load. The deformation of the cage is additionally taken into consideration by the line 0-3.

In theory and in the ideal situation, the cage would be at an angle of $\alpha\frac{1}{2}$ with respect to the initial extended or straight position when the joint has bent through an angle of $\alpha1$. However, because of manufacturing tolerances and the torque load, the cage will move from its initial extended position through an angle which is greater than one-half the bending angle of the joint as represented at point 4 on the graph of FIG. 3.

Figure 4:
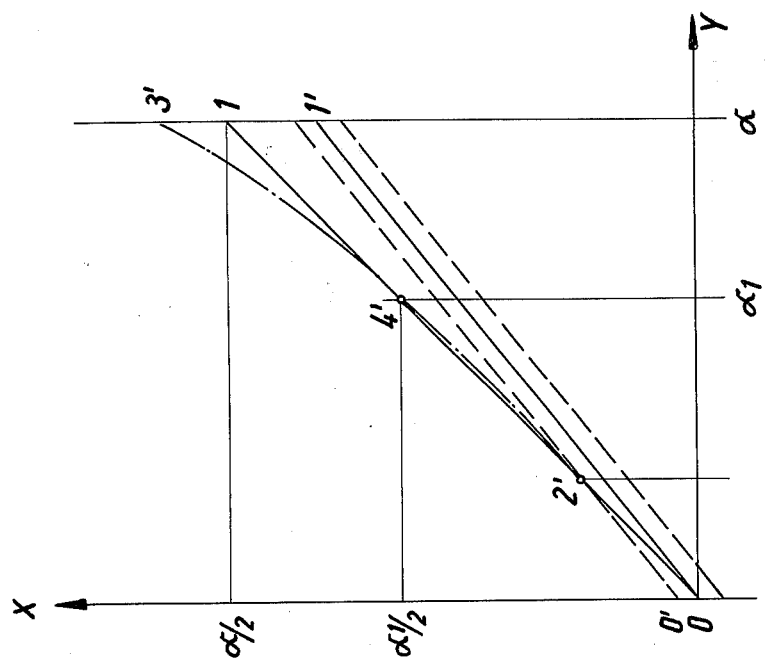
FIG. 4 is a graph similar to that of FIG. 3 but showing the angle relations in a universal joint incorporating the present invention.

In FIG. 4, the line $0-1^1$ indicates the theoretical position of the cage as affected by the corrective control factor and the other lines on the graph parallel therewith again indicate the tolerance deviation range. The line $0-3^1$ indicates the cage angle allowing for loads and clearances. The point $4^1$ is the position of the cage which corresponds to one-half of the bending angle $\alpha1$ of the joint.

Figure 5:
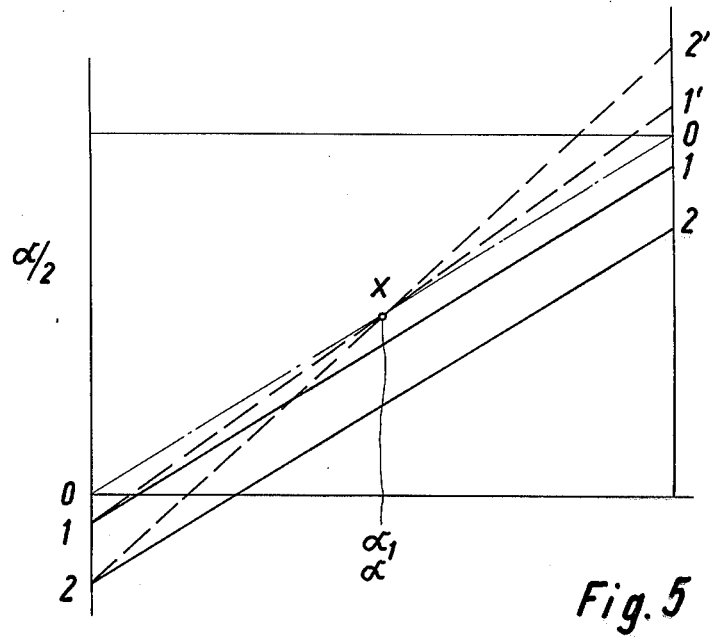
FIG. 5 is a graph similar to that of FIG. 4 but as applied to a double offset joint.

FIG. 5 is similar to that of FIG. 4 but is applied to the so-called double offset joint and does not allow for any deformation of the cage. The line 0-0 represents the ideal or designed position of the cage and the line 1—1 shows the actual position of the cage in a joint divided by a large offset and clearance. The line 2—2 shows the actual position of cage in a universal joint having a small offset and with a clearance S. It is pointed out, however, that the play or clearance values are independent of the offset. However, a large offset permits a comparatively more accurate direction alignment control for a given clearance while for the same clearance a smaller offset produces a substantially stronger variation in the actual cage position with respect to the ideal or designed position. For the bending angle $\alpha1$ there is a corrective alignment control which for a joint with a larger offset must be dimensioned according to the line $1—1^1$ and for a joint with a relatively smaller offset according to the line $2—2^1$.

Figure 6:
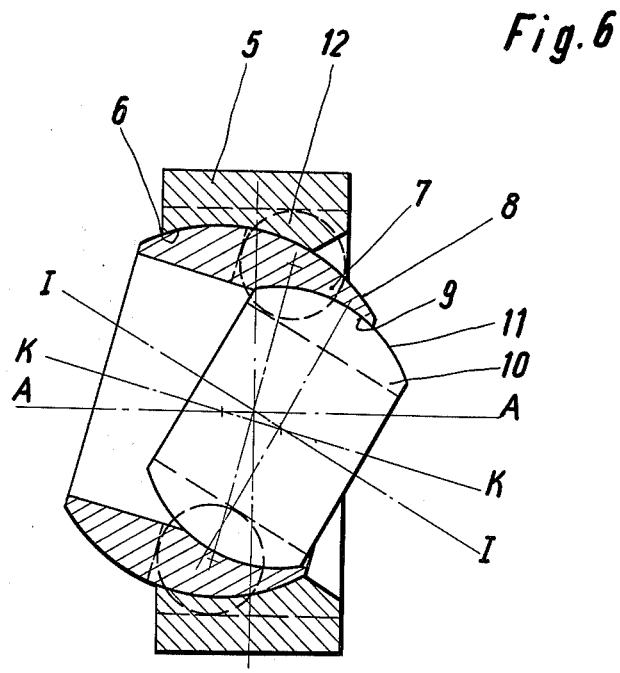
FIG. 6 is the diagrammatic representation of the main components in a double offset universal joint as viewed in a longitudinal sectional view.

The double offset joint of FIG. 6 comprises an outer joint member 5 having an inner concave spherical face 6 within which is received a spherical or convex outer face 8 of a cage 7. The cage 7 has an inner concave face 9 within which the inner joint member 10 is closely received by means of its convex outer spherical face 11. The cage 7 is also provided with a plurality of circumferentially spaced openings within which are received balls 12 which jointly engage the circumferentially spaced grooves in the outer joint member 5 and in the periphery of the inner joint member 10. The centers of the outer spherical convex surface 8 of the cage 7 and of the inner spherical concave surface 9 of the cage 7 are located on opposite sides of a plane passing through the centers of the balls 12. The axes I, K, and A indicate respective positions of the inner joint member 10, of the cage 7 and of the outer joint member 5. Because of manufacturing tolerances, the cage 7 is inclined at a greater angle with respect to the axis of the outer joint member 5 then with respect to the axis of the inner joint memner 10. This means that the angle between the axis K of cage 7 and the axis A of the outer joint member 5 is greater than the angle between the axis K of cage 7 and the axis I of the inner joint member 10.

Figure 7:
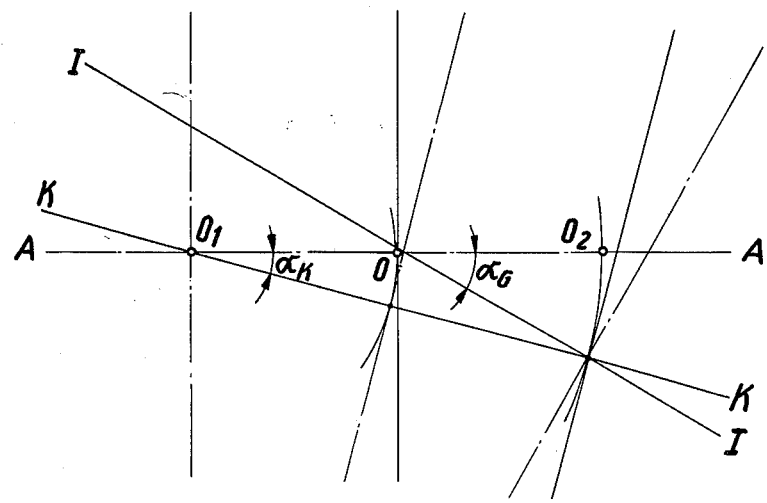
FIG. 7 shows the angle relationships and positions of the axes in a double offset universal joint of FIG. 6 but incorporating the present invention.

When the correct alignment control according to the present invention is applied to the joint shown in FIG. 6 the relationship will thus exist which are shown in FIG. 7 wherein K—K is the cage axis, A—A is the outer joint member axis and I—I is the axis of the inner joint member. The center of the outer spherical convex surface of the cage is indicated at the point $0_1$, the center of the universal joint is indicated at 0 and the center of the inner spherical concave surface of the cage is indicated at $0_2$ when the universal joint is at its straight position or at an angle of 0°. The offset of the center $0_2$ with respect to the plane passing through the balls is represented by the distance $0_1$—0 and the distance of the offset of the center of the concave surface of the cage with respect to the plane containing the balls is represented by $0_2$—0. According to the present invention, the offset distance $0_1$—0 is greater than the distance $0_2$—0 because of this distance relationship, the angle between the axis A—A and the axis K—K indicated as K is selected such as to compensate for manufacturing clearances. On the basis of the data obtained from the graph of FIG. 5, the angle $\alpha K$, is selected so as to be smaller than one-half of the angle $\alpha G$ which is the bending angle of the universal joint between the outer joint member axis A—A and the inner joint member axis I—I.

Alignment of the balls is thus corrected by means of relatively long lever arms of different lengths. A particular advantage of the above described double offset control structure resides in the precise control or alignment that can be obtained in spite of relatively large clearances or play between the joint components. The lengths of the lever arms may be made such as to achieve absolute synchronism through the main operating range of the joint so that in this range the full torque capacity of the joint may be utilized. It is preferable that the lever arms be determined with reference to the main operating range of the joint since under relatively large bending angles as would occur, for example, in the drive shaft of front wheel drive vehicles maximum torque is virtually never applied or effective when the wheels are turned to their maximum angle and thus the proportional share of such extreme conditions in the overall service of the joint is quite small.

Figure 8:
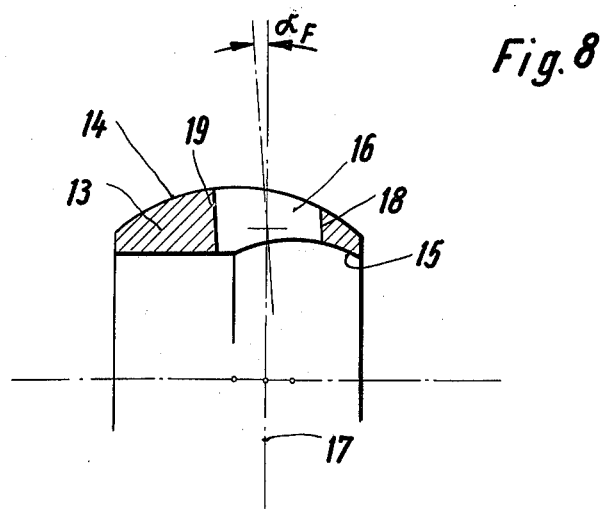
FIG. 8 is a longitudinal sectional view of a portion of a cage and showing the ball apertures therein constructed in accordance with the present invention.

In FIG. 8, there is shown a cage 13 having an outer or convex spherical face 14 which is guided in the usual manner within a correspondingly shaped spherical surface of an outer joint member. The cage 12 which is substantially tubular in construction has a concave or inner spherical face 15 by which it is guided along a correspondingly shaped spherical outer face of an inner joint member or of a individually provided control member or members carried upon the inner joint member. The centers of the convex spherical surface 14 and of the concave spherical surface 15 are located at equal distances on opposite sides of a normal plane 17 passing through the centers of balls which are retained in openings 16 formed in the cage. The surfaces 18, 19 of the ball opening 16 are inclined from the vertical by an angle of $\alpha F$ in such a manner that the surface 18 which is nearest to the concave spherical face 15 of the cage 13 is inclined toward the ball plane 17 in a direction outwardly of the cage. The second surface 19 of the opening is parallel to the surface 18.

During bending of a universal joint so that the inner joint member is angularly displaced with respect to the outer joint member the cage is generally displaced or bends through an angle which is slightly more than one-half of the total bending angle of the joint.

However, in the construction of FIG. 8, because of the relative movement in the radial direction between the inclined surface 18 of the ball opening and the balls caused by the bending of the joint, the balls in the windows 16 will be moved into the homokinetic plane.

Figure 9:
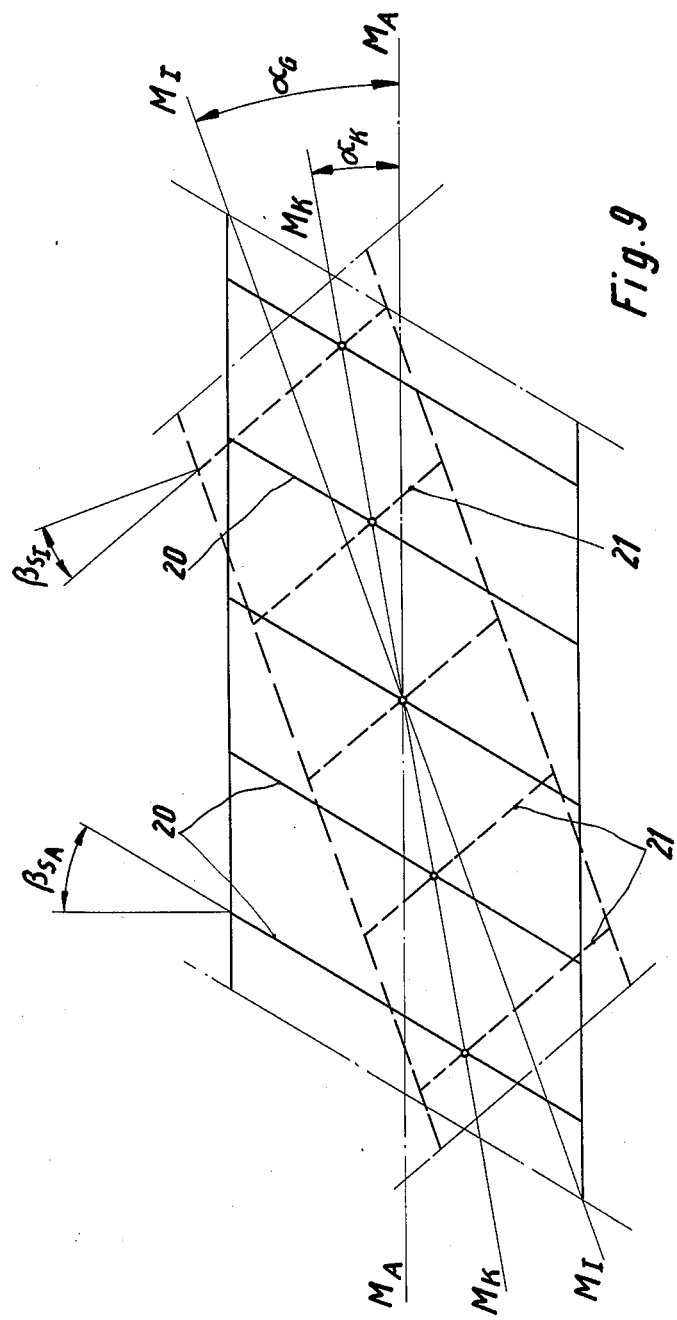
FIG. 9 is a diagrammatic representation showing the positioning of the ball grooves in the inner and outer members so as to be intersecting in accordance with the present invention.

According to the present invention the ball grooves of both the inner and outer joint members may be inclined at angles with respect to their respective longitudinal axes. FIG. 9 shows diagrammatically this inclined groove relationship with both the outer joint member (in solid lines) and the inner joint member (in dash lines) being shown in the developed form. The ball grooves 20 of the outer joint member are inclined at an angle of $\beta_{sa}$ with respect to the longitudinal axis of the outer joint member. The ball grooves 21 of the inner joint member are inclined at an angle $\beta_{si}$ with respect to the longitudinal axis of the inner joint member. The respective positions of the joint members and the cage during bending of the universal joint are shown with respect to the medial planes thereof starting from the extended or straight position of the joint. MI is the medial plane of the inner joint member. $M_A$ is the medial plane of the outer joint member and $M_K$ is the medial plane of the cage.

The total bending of universal joint is indicated by the angle $\alpha G$ between the planes MI and $M_A$. A line connecting the intersections between the ball grooves axes 20 of the outer joint member and the ball groove axes 21 of the inner joint member indicates the position of the medial plane $M_K$ of the cage in a joint having the usual clearance or play wherein the inclination angles of the grooves are different. In this embodiment angle $\beta_{sa}$ is greater than $\beta_{si}$ and starting from the normal or straight position the cage passes through an angle which is less than one-half of the total bending angle $\alpha G$. The difference in the angles of inclination up to half the total bending angle compensates for any play resulting from manufacturing tolerances or torque effects and the corresponding shift or displacement from the ideal or designed position. According to the present invention, the difference in the angles of inclination of the grooves is calculated from the play in the joint resulting from manufacturing tolerances. With these different angles of inclination of the grooves upon bending of the joint through an angle of $\alpha K$ the cage will actually bend through an angle corresponding to one-half of the total bending angle of the joint. In this manner, any play or clearances between the components of the joint resulting from manufacturing tolerances or other causes are compensated by the particular inclinations of the grooves of the outer and inner joint members.

Figure 10:
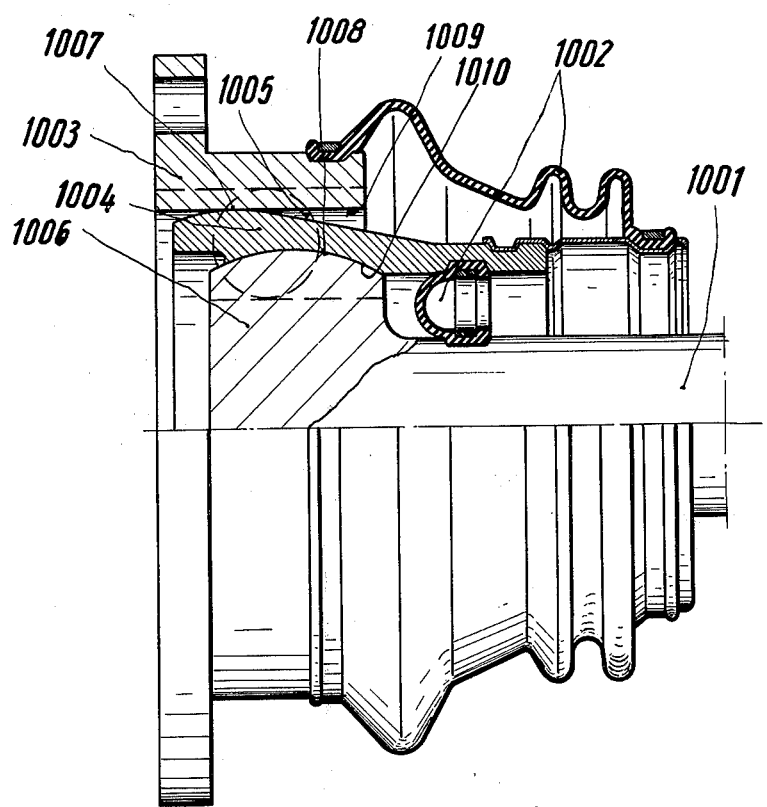
FIG. 10 is an elevational view with the upper half thereof being shown in longitudinal section of a double offset universal joint in which the present invention can be incorporated.

The invention as disclosed herein may be readily applied to various types of joints such as shown in FIGS. 10–15. In FIG. 10 there is shown a constant velocity univeral joint of the sliding type which operates on the double offset principle. This joint comprises an outer joint member 1003 having a bore 1009 therethrough, the surface of which is provided with a plurality of longitudinally extending circumferentially spaced parallel ball grooves or tracks. Within the bore 1009 there is provided a cage 1004 for retaining balls 1005 and the cage is provided with a spherical outer surface 1007 which is slideably positioned upon the surface of the bore 1009.

The cage 1004 is also provided with an inner concave spherical surface 1010 which is fitted for sliding movement upon correspondingly shaped spherical outer surface 1008 on an inner joint member 1006. The cage 1004 and the inner joint member 1006 are nonslideably mounted in the axial direction with respect to each other. The centers of the concave spherical surface 1010 and of the convex spherical surface 1007 of the cage 1004 are positioned on different sides of a plane passing through the centers of the balls 1005. The distances of these centers from the ball plane is determined in the manner as described above and illustrated by FIGS. 5–7.

The joint further comprises an output shaft 1001 which is connected to the inner joint member 1006 and flexible seating boots 1002 which enclose and seal off the space between the outer joint member 1003 and the shaft 1001.

Figure 11:
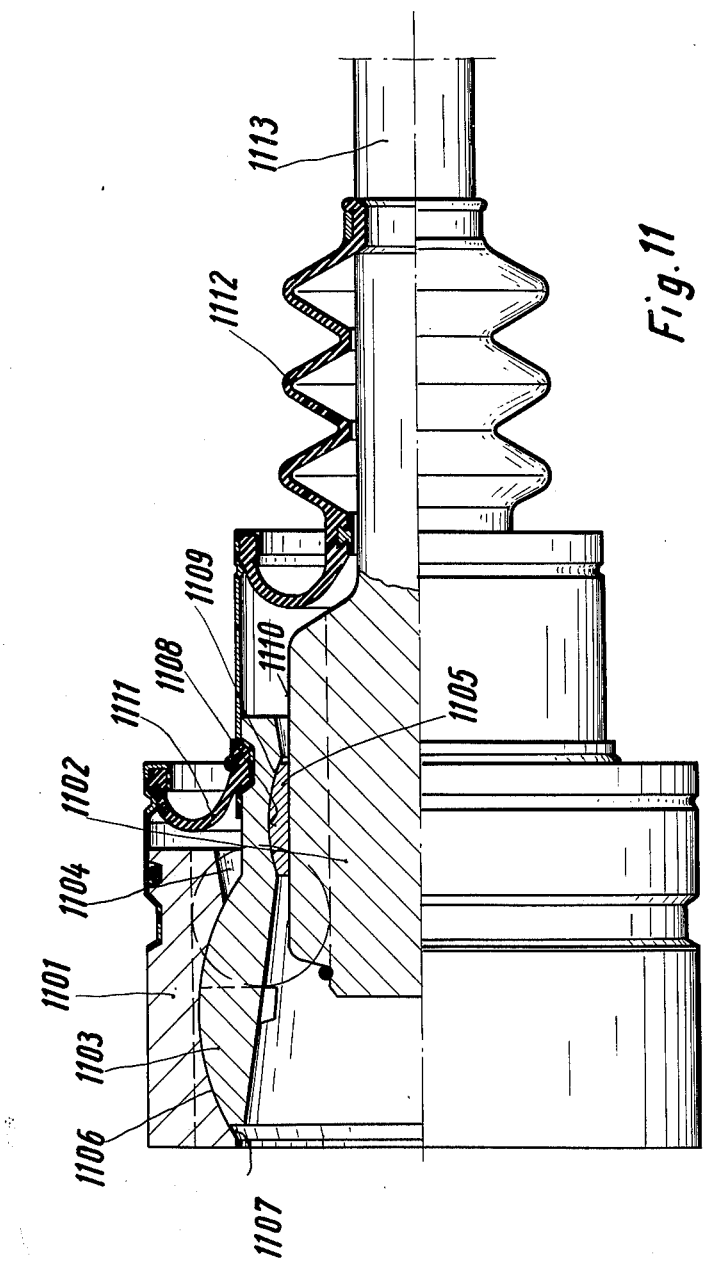
FIG. 11 is a view similar to that of FIG. 10 but showing a universal joint having control elements between the cage and inner joint member.

The invention can also be incorporated in another form of joint of the double offset type which is shown in FIG. 11. This joint comprises an outer joint member 1101, an inner joint member 1102, a cage 1103 retaining a plurality of torque transmitting balls 1104 and an alignment control member 1105 positioned upon the inner joint member. In a similar manner as described above the outer and inner joint members are each provided with corresponding pluralities of axially extending circumferentially spaced ball grooves or tracks so that a pair of oppositely disposed grooves on the outer and inner joint members will jointly receive and retain a ball 1104. The cage 1103 has an outer convex spherical surface 1107 which is guided by a correspondingly shaped spherical surface 1107 on the outer joint member 1101. The cage 1103 also has an inner concave spherical surface 1108 which is guided upon a correspondingly shaped convex surface 1109 on the alignment control member 1105 which is mounted on outer surface 1110 of an inner joint member 1102. The centers of the spherical surfaces 1108 and 1106 are positioned on opposite sides of a plane passing through the centers of the balls 1104. The actual magnitudes of the offset distances of the centers with respect to the ball plane are determined according to the present inventive concept as described above and illustrated in FIGS. 5–7. The joint is sealed by flexible boots 1111 and 1112 to prevent dirt and other foreign matter from penetrating into the joint. An output shaft 1113 is formed integrally with the inner joint member 1102.

Figure 12:
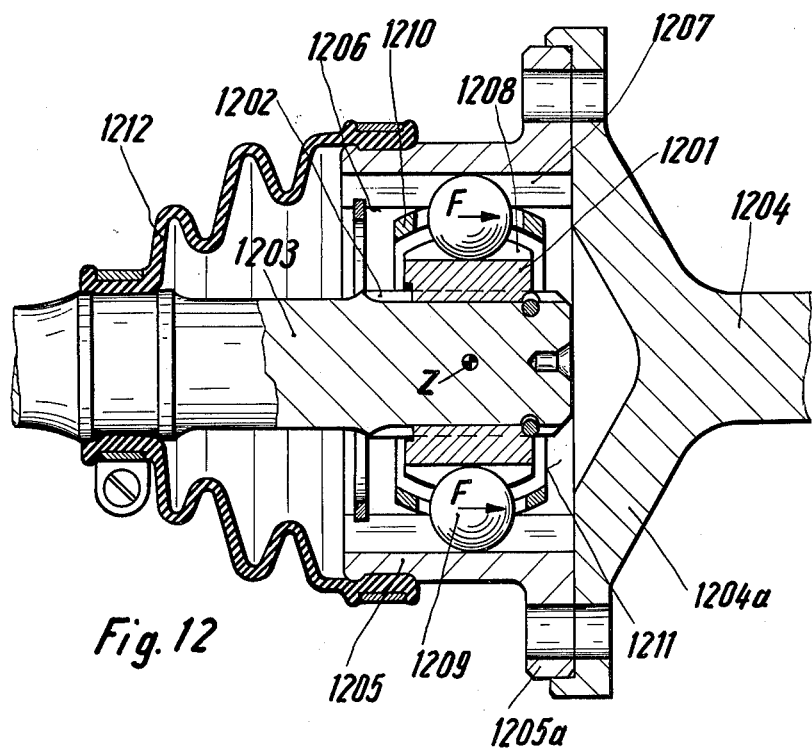
FIG. 12 is a longitudinal sectional view of a universal joint wherein the ball grooves of the inner and outer joint members are inclined with respect to their respective longitudinal axes.
Figure 13:
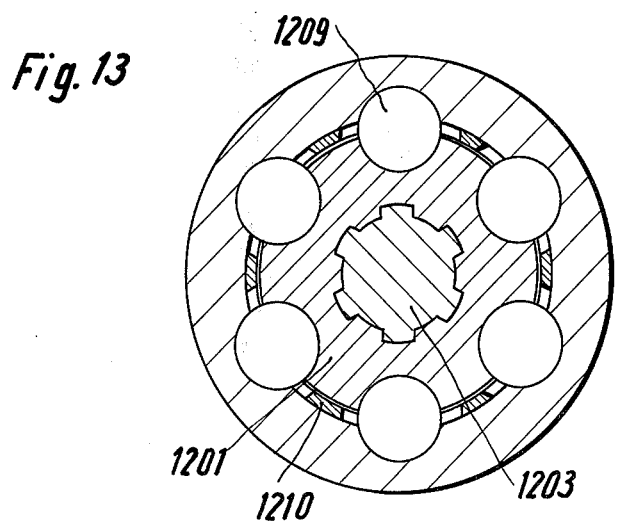
FIG. 13 is a transverse sectional view taken through the centers of the balls of FIG. 12.

In FIGS. 12–13 there is shown a universal joint in which there is incorporated a compensation control device of the inclined ball groove type as described above and illustrated in FIG. 9. In this joint, an inner joint member 1201 is secured upon splines 1202 an output shaft 1203 which is to be connected by a universal joint to another shaft 1204. The end of shaft 1204 is provided with a flange 1204a which is suitably connected by screw bolts with a flange 1205a of the joint. The outer joint member 1205 has a cylindrical inner surface 1206 provided with ball grooves 1207 which extend along a helical line. In order to simplify the illustration in FIG. 12 the grooves 1207 are positioned in the intermediate plane.

Figure 14:
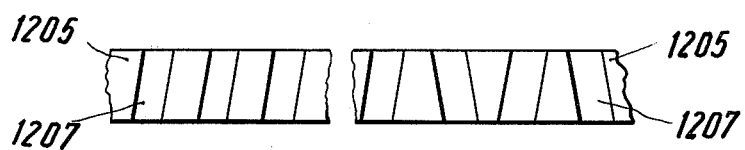
FIG. 14 and FIG. 15 are diagrammatic views showing the different angular relationships of inclined ball grooves on the inner and outer joint members according to the present invention.
Figure 15:
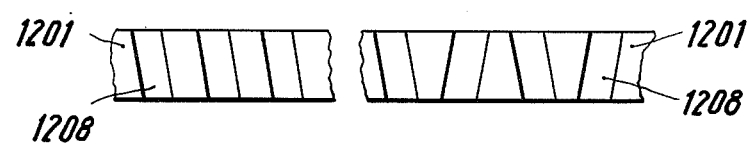

The inner joint member 1201 is similarly provided on its outer peripheral surface with grooves 1208 also extending along an helical line which, in FIG. 12, is shown as being turned into the plane of the drawing similarly as for grooves 1207. In each pair of mutually facing or oppositely directing grooves 1207 and 1208 there are positioned balls 1209 which transmit torque between the joint members. The balls 1209 are retained in a cage 1210 whose inner surface is spaced from the outer surface 1211 of the inner joint member 1201. The grooves 1207 in the outer joint member 1205 may be alternately inclined in the manner as shown in FIG. 14. The grooves 1208 of the inner joint member 1201 may be arranged in the opposite direction to the corresponding grooves 1207 of the outer joint member 1205 as may be seen in FIGS. 14 and 15 so that in each case mutually associated or corresponding grooves 1207 and 1208 will cross or intersect each other. The joint is sealed by a boot 1212 which has one end secured to the outer joint member 1205 and the other end to the shaft 1203.

Thus it can be seen that the corrective or compensating direction control as disclosed in the present invention permits greater manufacturing tolerances or clearances in the components of such a universal joint without affecting adversely the quality of control of the joint. It is also apparent that because of a more uniform load distribution on the balls, a universal joint of a given outer diameter has a larger torque capacity or conversely for a given torque capacity the universal joint may be constructed smaller in size. The more favorable and uniform load distribution also results in a considerably longer and more reliable operating and useful life and there is a significant reduction in noise during operation of the joint since all of the balls are loaded and there is little fluctuation in the loads on the individual balls.

It will be understood that this invention is susceptible to modification in order to adapt to different usages ans conditions, and accordingly, it is desired to comprehend such modifications within this invention as may fall within the scope of the appended claims.

What is claimed is:

1. A constant velocity torque transmitting universal joint comprising an outer joint member having a bore therethrough and a plurality of grooves in the surface of said bore, an inner joint member within said bore and having a plurality of grooves in the outer surface thereof opposing said outer joint grooves, a ball in each pair of opposed inner and outer joint member grooves, the balls being disposed in a plane passing through the axes of the outer and inner joint members, the balls being subjected to a force due to play in the joints to displace the balls from the homokinetic plane, and means on the universal joint for increasing the angle between the plane passing through the balls and the axis of the inner joint member to control the alignment direction of the balls with respect to the homokinetic plane.

2. A constant velocity torque transmitting universal joint as claimed in claim 1 wherein said means is on an element of said joint and coacts with said balls to bias the ball plane in a direction to increase the angle between the ball plane and the axis of said inner joint member.

3. A constant velocity torque transmitting universal joint as claimed in claim 1 and comprising ball retaining means comprising a cage having an outer convex spherical surface moveably received in a corresponding surface on the bore of the outer joint member and an inner concave spherical surface moveably mounted upon a corresponding surface in said inner joint member, the centers of the cage convex and concave spherical surfaces being on opposite sides of said ball plane, the distance of the center of said cage concave surface from the ball plane being greater than the distance of the center of said convex surface from the ball plane.

4. A constant velocity torque transmitting universal joint as claimed in claim 1 wherein the grooves on said outer and inner joint members are at an angle to the respective longitudinal axes thereof and opposed grooves intersect each other.

5. A constant velocity torque transmitting universal joint as claimed in claim 4 wherein the grooves of the outer joint member are at a larger angle to the longitudinal axis thereof than the grooves on the inner joint member are to its longitudinal axis.

6. A constant velocity torque transmitting universal joint as claimed in claim 1 and comprising ball retaining means comprising a cage having an outer convex spherical surface moveably received in a corresponding surface on the bore of the outer joint member and an inner concave spherical surface moveably mounted upon a corresponding surface on said inner joint member, the centers of the cage convex and concave spherical surfaces being on opposite sides of said ball plane, there being a plurality of openings in said cage in which said balls are positioned, the walls of the openings nearest the inner concave spherical surface of the cage are inclined toward the ball plane in a direction outwardly of the cage and the opposed walls of the openings are parallel to their respective inclined walls.

* * * * *